United States Patent
Noguchi et al.

(10) Patent No.: US 8,591,800 B2
(45) Date of Patent: Nov. 26, 2013

(54) METHOD FOR PRODUCING CORDIERITE-BASED HONEYCOMB STRUCTURE

(75) Inventors: Yasushi Noguchi, Nagoya (JP); Hiroyuki Suenobu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 903 days.

(21) Appl. No.: 11/660,674

(22) PCT Filed: Sep. 22, 2005

(86) PCT No.: PCT/JP2005/017483
§ 371 (c)(1),
(2), (4) Date: Feb. 21, 2007

(87) PCT Pub. No.: WO2006/033392
PCT Pub. Date: Mar. 30, 2006

(65) Prior Publication Data
US 2007/0259153 A1    Nov. 8, 2007

(30) Foreign Application Priority Data
Sep. 24, 2004 (JP) .................. 2004-276765

(51) Int. Cl.
*C04B 33/32* (2006.01)
*C04B 35/195* (2006.01)

(52) U.S. Cl.
USPC ........................................ 264/631

(58) Field of Classification Search
USPC .............................. 264/630, 631
See application file for complete search history.

(56) References Cited

U.S. PATENT DOCUMENTS

| | | |
|---|---|---|
| 468,317 A | 1/1892 | Davis |
| 2,710,701 A | 6/1955 | Hale |
| 4,898,317 A | 2/1990 | Ito et al. |
| 5,002,909 A | 3/1991 | Montino et al. |

(Continued)

FOREIGN PATENT DOCUMENTS

| | | | |
|---|---|---|---|
| CN | 1278458 A | * | 1/2001 |
| EP | 0 201 319 A2 | | 11/1986 |

(Continued)

OTHER PUBLICATIONS

CN 1278458 A (Ding et al) Jan. 3, 2001 (English language machine translation). [online] [retrieved Apr. 9, 2013]. Retrieved from: Espacenet.*

(Continued)

*Primary Examiner* — Joseph S Del Sole
*Assistant Examiner* — Erin Snelting
(74) *Attorney, Agent, or Firm* — Oliff & Berridge, PLC

(57) ABSTRACT

A method of manufacturing a cordierite-based honeycomb structure, comprising: adding an alumina source material, a silica source material and a magnesia source material to obtain a cordierite forming material; obtaining a clay by use of the resultant cordierite forming material; extruding the resultant clay into a honeycomb shape to obtain a formed honeycomb body; drying the resultant formed honeycomb body to obtain a dried honeycomb body; and firing the resultant dried honeycomb body to manufacture the cordierite-based honeycomb structure, wherein a first alumina source material having a degree of circularity of 0.70 or more and an average particle diameter of 1 to 10 μm is added as at least the alumina source material in an amount of 10 mass % or more with respect to the total mass of the cordierite forming material to obtain the cordierite forming material.

9 Claims, 1 Drawing Sheet

(56) References Cited

U.S. PATENT DOCUMENTS

| | | |
|---|---|---|
| 6,589,465 B2 | 7/2003 | Kumazawa et al. |
| 2003/0166450 A1* | 9/2003 | Kumazawa et al. .......... 501/119 |
| 2004/0180991 A1* | 9/2004 | Che et al. ...................... 523/223 |
| 2006/0145402 A1 | 7/2006 | Ito et al. |

FOREIGN PATENT DOCUMENTS

| | | |
|---|---|---|
| EP | 1 298 112 A1 | 2/2003 |
| GB | 2 175 293 A | 11/1986 |
| JP | A 60-226416 | 11/1985 |
| JP | A-61-256965 | 11/1986 |
| JP | A 6-172023 | 6/1994 |
| JP | A 7-196363 | 8/1995 |
| JP | A 9-227223 | 9/1997 |
| JP | A 2003-40687 | 2/2003 |
| JP | A-2003-176127 | 6/2003 |
| WO | WO 01/58827 A1 | 8/2001 |
| WO | WO 03/014041 A2 | 2/2003 |
| WO | WO 2004/058663 A1 | 7/2004 |

OTHER PUBLICATIONS

Aug. 12, 2010 European Search Report issued in European Application No. 05785604.9.

Dec. 4, 2012 Notification of Reexamination issued in Chinese Application No. 200580031966.0 (with English translation).

* cited by examiner

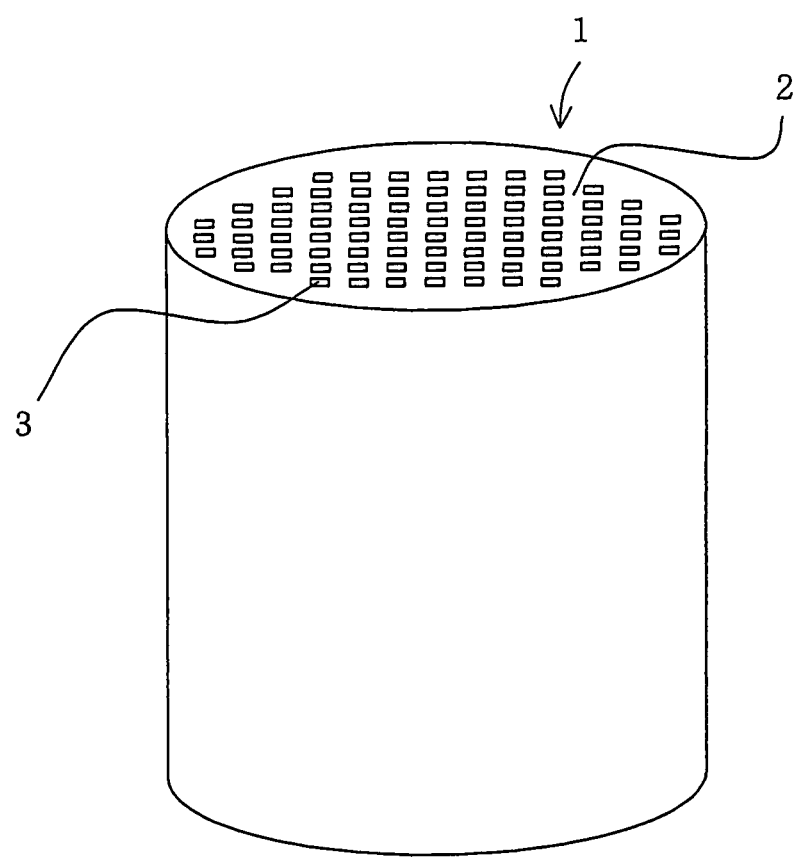

METHOD FOR PRODUCING CORDIERITE-BASED HONEYCOMB STRUCTURE

TECHNICAL FIELD

The present invention relates to a method of manufacturing a cordierite-based honeycomb structure. The present invention more particularly relates to a cordierite-based honeycomb structure manufacturing method capable of obtaining a cordierite-based honeycomb structure having a pressure loss reduced.

BACKGROUND ART

There is an increasing necessity of removing, from exhaust gases, particulates and toxic substances in the exhaust gases of an internal combustion engine, a boiler and the like in consideration of influences on environments. Especially, regulations concerning removal of the particulates (hereinafter referred to as the "PM" in some case) discharged from a diesel engine tend to be globally tightened. Attentions are paid to use of a filter (a honeycomb filter) constituted of a honeycomb structure as a trapping filter (a diesel particulate filter, hereinafter referred to as the "DPF" in some case) for removing the PM, and various systems are proposed. The above DPF has a structure in which a plurality of cells constituting channels of a fluid are usually defined by porous partition walls. Since the cells are alternately plugged, the porous partition walls constituting the cells perform a function of the filter. As a material of the DPF, a cordierite is preferably used because it has a low coefficient of thermal expansion and a high resistance to thermal shock.

Such a cordierite-based honeycomb structure is manufactured by, for example, obtaining a clay by use of a cordierite forming material including an alumina source material which is an alumina source; extruding the resultant clay into a honeycomb shape to obtain a formed honeycomb body in which a plurality of cells are defined by the partition walls; drying the resultant formed honeycomb body to obtain a dried honeycomb body; and firing the resultant dried honeycomb body (e.g., Patent Document 1).

The honeycomb filter using the honeycomb structure manufactured in this manner is attached to an exhaust gas system of the diesel engine when used. Therefore, reduction of a pressure loss of the filter is demanded so that a performance of the engine can sufficiently be exerted.

Patent Document 1: Japanese Patent Application Laid-Open No. 2003-40687

DISCLOSURE OF THE INVENTION

However, in a conventional manufacturing method, a pressure loss of the resultant cordierite-based honeycomb structure cannot effectively be reduced. Especially, while a composition and a porosity of the resultant cordierite substance are maintained, the pressure loss of the structure cannot be reduced, which has raised a problem.

The present invention has been developed in view of such a problem of a conventional technology, and an object thereof is to provide a cordierite-based honeycomb structure manufacturing method capable of obtaining a cordierite-based honeycomb structure having a pressure loss reduced.

As a result of an intensive study to solve the above problem, the present inventors have found that an alumina source material included in a cordierite forming material for use in a conventional honeycomb structure manufacturing method includes a large number of particles having a comparatively low degree of circularity, that is, comparatively flat particles. When extrusion molding is performed using such a clay, the flat particles are arranged on the surfaces of partition walls of a formed honeycomb body, openings of pores of a porous body are not sufficiently formed. This is a cause which hinders reduction of the pressure loss of the honeycomb structure as a final product. Moreover, they have thought that the above problem can be solved by using the alumina source material including a predetermined ratio of alumina source material particles having a predetermined shape, and they have completed the present invention. That is, according to the present invention, the following cordierite-based honeycomb structure manufacturing method is provided.

[1] A method of manufacturing a cordierite-based honeycomb structure, comprising: adding an alumina source material, a silica source material and a magnesia source material to obtain a cordierite forming material; obtaining a clay by use of the resultant cordierite forming material; extruding the resultant clay into a honeycomb shape to obtain a formed honeycomb body in which a plurality of cells are defined by partition walls; drying the resultant formed honeycomb body to obtain a dried honeycomb body; and firing the resultant dried honeycomb body to manufacture the cordierite-based honeycomb structure, wherein a first alumina source material having a degree of circularity of 0.70 or more and an average particle diameter of 1 to 10 μm is added as at least the alumina source material in an amount of 10 mass % or more with respect to the total mass of the cordierite forming material to obtain the cordierite forming material.

[2] The method of manufacturing the cordierite-based honeycomb structure according to the above [1], wherein particles of alumina and/or aluminum hydroxide are used as the first alumina source material.

[3] The method of manufacturing the cordierite-based honeycomb structure according to the above [1] or [2], wherein the first alumina source material has a degree of circularity of 0.80 or more.

[4] The method of manufacturing the cordierite-based honeycomb structure according to any one of the above [1] to [3], wherein the first alumina source material includes particles having particle diameters of 5 μm or more in an amount of 10 mass % or more with respect to the total mass of the first alumina source material.

[5] A cordierite-based honeycomb structure obtained by adding an alumina source material, a silica source material and a magnesia source material to obtain a cordierite forming material; obtaining a clay by use of the resultant cordierite forming material; extruding the resultant clay into a honeycomb shape to obtain a formed honeycomb body in which a plurality of cells are defined by partition walls; drying the resultant formed honeycomb body to obtain a dried honeycomb body; and firing the resultant dried honeycomb body, wherein the cordierite forming material is obtained by adding a first alumina source material having a degree of circularity of 0.70 or more and an average particle diameter of 1 to 10 μm as at least the alumina source material in an amount of 10 mass % or more with respect to the total mass of the cordierite forming material.

[6] The cordierite-based honeycomb structure according to the above [5], wherein in a case where the partition walls constituting the cordierite-based honeycomb structure are porous bodies and the surfaces of the partition walls constituting the cordierite-based honeycomb structure are flat surfaces, a ratio of areas of openings of pores formed in the surfaces of the partition walls with respect to the total area is in a range of 30 to 50%.

According to the cordierite-based honeycomb structure manufacturing method of the present invention, a large number of openings of pores of the porous bodies can be formed in the surfaces of the partition walls to thereby obtain the cordierite-based honeycomb structure having the pressure loss reduced. In consequence, it is possible to obtain the cordierite-based honeycomb structure in which the pressure loss can be reduced while a composition and a porosity of the cordierite-based honeycomb structure as a product are maintained and which is excellent even in shock resistance or heat resistance. When the resultant cordierite-based honeycomb structure is used as a catalyst carrier, catalysts can easily be carried on the surfaces of the partition walls of the structure, and the structure can preferably be used.

BRIEF DESCRIPTION OF THE DRAWINGS

FIG. 1 is a perspective view showing one example of a cordierite-based honeycomb structure obtained according to one embodiment of a cordierite-based honeycomb structure manufacturing method of the present invention.

DESCRIPTION OF REFERENCE NUMERALS

1: cordierite-based honeycomb structure, 2: partition walls and 3: cells.

BEST MODE FOR CARRYING OUT THE INVENTION

The best mode for carrying out the present invention will hereinafter be described specifically, but the present invention is not limited to this mode when interpreted, and can variously be altered, modified or improved based on knowledge of those skilled in the art without departing from the scope of the present invention.

One mode for carrying out a cordierite-based honeycomb structure manufacturing method of the present invention is a method of manufacturing a cordierite-based honeycomb structure, including: adding an alumina source material, a silica source material and a magnesia source material to obtain a cordierite forming material; obtaining a clay by use of the resultant cordierite forming material; extruding the resultant clay into a honeycomb shape to obtain a formed honeycomb body in which a plurality of cells are defined by partition walls; drying the resultant formed honeycomb body to obtain a dried honeycomb body; and firing the resultant dried honeycomb body to manufacture the cordierite-based honeycomb structure (hereinafter referred to simply as the "honeycomb structure" in some case). A first alumina source material having a degree of circularity of 0.70 or more (i.e., a degree of circularity of 0.70 to a degree of circularity of a perfect circle which is 1.00) and an average particle diameter of 1 to 10 µm is added as at least the alumina source material in an amount of 10 mass % or more (i.e., 10 to 100 mass %) with respect to the total mass of the cordierite forming material to obtain the cordierite forming material.

In a conventional honeycomb structure manufacturing method, as the alumina source material constituting the cordierite forming material for obtaining the clay, a material including a large number of particles having a comparatively low degree of circularity, that is, comparatively flat particles was used. Therefore, when the porous cordierite-based honeycomb structure was manufactured, the comparatively flat particles of the alumina source material were arranged on the surfaces of the partition walls of the extrusion-molded honeycomb body, and the openings of the pores were not satisfactorily formed in the surfaces of the partition walls.

In the cordierite-based honeycomb structure manufacturing method of the present embodiment, to obtain the cordierite forming material as described above, as at least the alumina source material, the first alumina source material having a degree of circularity of 0.70 or more (i.e., 0.70 to 1.00) and an average particle diameter of 1 to 10 µm is used in an amount of 10 mass % or more (i.e., 10 to 100 mass %) with respect to the total mass of the cordierite forming material. Therefore, when the particles of the alumina source material are arranged on the surfaces of the partition walls, gaps are made in accordance with a curvature of each particle surface, the gaps constitute the openings of the pores, and it is therefore possible to reduce a pressure loss of the resultant cordierite-based honeycomb structure.

It is to be noted that there are a large number of particles of the alumina source material having a comparatively high melting point in the cordierite forming material, and the particles are capable of especially effectively functioning as an aggregate. According to the cordierite-based honeycomb structure manufacturing method of the present embodiment, even while a composition or a porosity of the cordierite-based honeycomb structure as a product is maintained, the pressure loss of the structure can be reduced. Therefore, it is possible to obtain the cordierite-based honeycomb structure which is excellent even in shock resistance and heat resistance. In a case where the structure is used as a catalyst carrier, since many pore openings are present in the surfaces of the partition walls, a catalyst is easily carried, and the structure is preferably usable.

It is to be noted that the "a degree of circularity" in the present description is an indicator indicating a degree of deviation of a shape of a particle as an object as viewed along a plane from a perfect circle, and it means a degree of circularity SD calculated based on the following formula (1) in which a projection area S and a peripheral length of the particle are measured using a flow type particle image analysis device (e.g., trade name: FPIA-2000, manufactured by Sysmex Corporation). According to this indicator, a degree of circularity of 1.00 is that of the perfect circle. The smaller this value is, the larger the deviation from the perfect circle is.

$$SD = 4\pi S/L^2 \quad (1),$$

in which SD: a degree of circularity, S: projection area and L: peripheral length.

Moreover, the "average particle diameter" mentioned in the present description means a value of a 50% particle diameter measured by an X-ray transmission type particle size distribution measurement device (e.g., trade name: Sedigraph 5000-02 type, manufactured by Shimadzu Corporation or the like) in which the Stokes' liquid-phase precipitation method is used as a measurement principle and detection is performed by an X-ray transmission method. It is to be noted that Sedigraph 5000-02 type has a measurement range of 0.1 to 300 µm.

As shown in FIG. 1, a cordierite-based honeycomb structure manufactured by the cordierite-based honeycomb structure manufacturing method of the present embodiment is a cordierite-based honeycomb structure 1 in which a plurality of cells 3 are defined by porous partition walls 2.

As described above, this cordierite-based honeycomb structure 1 is a cordierite-based honeycomb structure obtained by adding an alumina source material, a silica source material and a magnesia source material to obtain the cordierite forming material; obtaining the clay by use of the resultant cordierite forming material; extruding the resultant clay into the honeycomb shape to obtain the formed honeycomb body in which the plurality of cells are defined by the partition walls; drying the resultant formed honeycomb body to obtain the dried honeycomb body; and firing the resultant dried honeycomb body, wherein the cordierite forming material is obtained by adding the first alumina source material having a degree of circularity of 0.70 or more (i.e., a degree of circularity of 0.70 to the degree of circularity of the perfect circle which is 1.00) and an average particle diameter of 1 to 10 μm as at least the alumina source material in an amount of 10 mass % or more (i.e., 10 to 100 mass %) with respect to the total mass of the cordierite forming material.

It is to be noted that there is not any special restriction on the whole shape of the resultant cordierite-based honeycomb structure 1, and examples of the shape include a quadratic prism shape and a triangular prism shape in addition to a cylindrical shape shown in FIG. 1. There is not any special restriction on a cell shape (a cell shape in a section of the cell 3 vertical to a cell forming direction), and examples of the shape include shapes of a hexagonal cell, a triangular cell and a circular cell in addition to a quadrangular cell shown in FIG. 1. It is to be noted that such a cordierite-based honeycomb structure is usable as the catalyst carrier, when the catalyst is carried, for example, on the porous partition wall surfaces or in the pores. When one opening and the other opening in a plurality of cells are alternately plugged, the structure is also usable as a filter.

It is to be noted that in the cordierite-based honeycomb structure manufactured by the cordierite-based honeycomb structure manufacturing method of the present embodiment, it is preferable that a ratio (hereinafter referred to simply as the "ratio of the opening areas of the pores" in some case) of areas of the openings of the pores formed in the surfaces of the partition walls with respect to the total area is in a range of 30 to 50% in a case where the partition walls constituting the cordierite-based honeycomb structure are porous bodies and the surfaces of the partition walls are flat surfaces. When the ratio of the opening areas of the pores is in the above range, the pressure loss is reduced while retaining a mechanical strength sufficient for use in the filter or the like.

To obtain the above ratio of the opening areas of the pores, an image of the surfaces of the partition walls of the resultant cordierite-based honeycomb structure is taken with a scanning type electron microscope (SEM), and the resultant image is binarized by image processing to obtain the total area in a case where the surfaces of the partition walls are flat surfaces and the opening areas of the pores formed in the surfaces of the partition walls. The ratio can be calculated from the resultant values.

The cordierite-based honeycomb structure manufacturing method of the present embodiment will be described hereinafter for each step in more details. First, the alumina source material, the silica source material and the magnesia source material constituting an alumina source, a silica source and a magnesia source in a cordierite composition are added to obtain the cordierite forming material. A dispersion medium such as water is added to the resultant cordierite forming material, and the material is mixed and kneaded to obtain the clay. This cordierite forming material means a substance which can be converted into a cordierite by firing. Specifically, the material is a mixture including the above-described silica source material, alumina source material and magnesia source material. A material obtained by mixing these material particles so that a composition after fired is a theoretical composition $(2MgO \cdot 2Al_2O_3 \cdot 5SiO_2)$ of the cordierite is usually used. Specifically, a material is preferably used which is obtained by mixing the materials at a ratio of 47 to 53 mass % of particles of the silica source material in terms of silica, 32 to 38 mass % of particles of the alumina source material in terms of alumina and 12 to 16 mass % of particles of the magnesia source material in terms of magnesia. Such material particles are used as the aggregate of a porous structure. As described above, the cordierite-based honeycomb structure manufacturing method of the present embodiment is characterized in that the first alumina source material having a degree of circularity of 0.70 or more (i.e., 0.70 to 1.00) and an average particle diameter of 1 to 10 μm is added as at least the alumina source material in an amount of 10 mass % or more (i.e., 10 to 100 mass %) with respect to the total mass of the cordierite forming material to obtain the cordierite forming material.

The alumina source material may be particles of alumina, an alumina-containing composite oxide, a substance converted into alumina when fired or the like. However, it is preferable to use particles of alumina or alumina hydroxide $(Al(OH)_3)$ obtainable as a commercial material including less impurities, and it is further preferable to use particles of alumina and aluminum hydroxide together. Since particles of kaolin $(Al_2O_3 \cdot 2SiO_2 \cdot 2H_2O)$, mullite $(3Al_2O_3 \cdot 2SiO_2)$ and the like are substances performing functions of the alumina source and the silica source, the particles are also usable as the alumina source material. It is to be noted that in a case where the alumina source material contains a predetermined ratio of or more first alumina source material having the above shape, there is not any special restriction on a shape or a particle diameter of another alumina source material particle necessary for realizing the theoretical composition of the cordierite.

Furthermore, in the present embodiment, the degree of circularity of the first alumina source material is preferably 0.80 to 1.00, especially preferably 0.85 to 1.00. Thus, when the degree of circularity of the first alumina source material increases, that is, the shape of the first alumina source material is brought close to a spherical shape, the openings of the pores formed in the partition wall surfaces increase, and it is possible to further obtain an effect of reducing the pressure loss of the resultant cordierite-based honeycomb structure. The particles having a high degree of circularity are preferable in that they are stably present at a high temperature during firing and that pore diameters are easily controlled. It is to be noted that when the degree of circularity of the first alumina source material is less than 0.70, the openings of the pores are not sufficiently formed in the partition wall surfaces. Therefore, the effect of reducing the pressure loss cannot be obtained. When the roundness of the first alumina source material is less than 0.80, the effect of reducing the pressure loss deteriorates in some case.

It is to be noted that in order to obtain the effect of the present invention, a higher degree of circularity of the first alumina source material is preferable, but this is sometimes disadvantage in respect of productivity, manufacturing cost or the like. From such a viewpoint, it is preferable that the degree of circularity of the first alumina source material has a maximum value of 0.90. , That is, in the cordierite-based honeycomb structure manufacturing method of the present embodiment, the degree of circularity of the first alumina source material is preferably 0.70 to 0.90, further preferably 0.80 to 0.90, especially preferably 0.85 to 0.90.

Examples of a method (a spheroidizing treatment) of obtaining the particles having the above degree of circularity include a method of heating predetermined alumina source material particles at a melting point of the particles or a higher temperature. When the predetermined alumina source material particles are heated at the melting point of the particles or a higher temperature, the surfaces of the particles are melted, and spherical particles (the first alumina source material) having less edge portions can be obtained. For example, since alumina has a melting point of 2050° C., the spheroidizing treatment is easily performed by a method of heating treatment of the particles in flames at 2050° C. or more, and the alumina source material particles having a degree of circularity of 0.70 or more (i.e., 0.70 to 1.00) can easily be obtained. It is to be noted that it is preferable to set the temperature during the heating treatment to a range from the melting point of the substrate as the object to a 300° C. higher temperature than the melting point. Therefore, when the alumina source material particles are heated as described above, it is preferable to perform the heating treatment in flames at 2050 to 2350° C.

Moreover, a method is preferably usable in which the predetermined alumina source material particles are crushed with a jet air current. When the predetermined alumina source material particles are crushed with the jet air current, the surfaces of the predetermined alumina source material particles are worn, and the spherical particles having less edge portions can be obtained. Specifically, examples of the method include a method in which the predetermined alumina source material particles are jetted under pressure from a nozzle together with a high-pressure gas such as air or nitrogen by use of a device such as a jet mill to perform the crushing treatment by use of friction or collision of the predetermined alumina source material particles themselves.

Furthermore, in the present embodiment, the above first alumina source material needs to be added as the alumina source material in an amount of 10 mass % or more (i.e., 10 to 100 mass %) with respect to the total mass of the cordierite forming material to obtain the cordierite forming material. However, in order to more securely obtain the effect of reducing the pressure loss, the first alumina source material is added in an amount of preferably 15 mass % or more (i.e., 15 to 100 mass %), especially preferably 20 mass % or more (i.e., 20 to 100 mass %) with respect to the total mass of the cordierite forming material. It is to be noted that in a case where the mass of the first alumina source material is less than 10 mass % with respect to the total mass of the cordierite forming material, the amount of the first alumina source material is excessively low, and the effect of reducing the pressure loss cannot sufficiently be obtained.

In addition, for example, depending on the type of the alumina source material, there are also particles which should not be subjected to the spheroidizing treatment. It is sometimes preferable that, for example, kaolin or the like is not subjected to the spheroidizing treatment. In a case where a formed body having a honeycomb shape is obtained by use of extrusion molding to extrude the material from a die having slits each having a shape complementary to that of the partition wall to be formed, plate-like crystals of talc or kaolin are oriented when passing through the slits of the die. Therefore, a preferable effect is produced that the finally obtained cordierite-based honeycomb structure has a low coefficient of thermal expansion.

Therefore, it is preferable to set an upper limit of the first alumina source material to 33 mass %. That is, in a case where the preferable upper limit of the first alumina source material is considered, the first alumina source material is added in an amount of preferably 10 to 33 mass %, further preferably 15 to 33 mass %, especially preferably 20 to 33 mass % with respect to the total mass of the cordierite forming material.

Moreover, the first alumina source material for use in the cordierite-based honeycomb structure manufacturing method of the present embodiment has an average particle diameter of 1 to 10 μm, but it is preferable that the diameter is 1 to 5 μm, and it is especially preferable that the diameter is 2 to 5 μm. The first alumina source material spherical particles having such an average particle diameter have sizes which are very suitable for aggregate particles of the cordierite forming material. When these particles are arranged, spaces constituting the openings of the pores of the porous body can satisfactorily be formed.

It is to be noted that in the cordierite-based honeycomb structure manufacturing method of the present embodiment, it is preferable that the first alumina source material includes particles (i.e., all the particles of the first alumina source material for use that have particle diameters of 5 μm or more) having particle diameters of 5 ∞m or more in an amount of 10 mass % or more (i.e., 10 to 100 mass %) with respect to the total mass of this first alumina source material, further preferably 10 to 76 mass %. As to the first alumina source material for use, the alumina source material having particle diameters of 5 μm or more (all the particles having particle diameters of 5 μm or more) is especially preferable as both of the aggregate and the material which forms the space suitable as the opening of the pore.

Furthermore, in the cordierite-based honeycomb structure manufacturing method of the present embodiment, it is further preferable that the maximum particle diameter of the first alumina source material for use is set to 300 μm and that the first alumina source material includes particles having particle diameters of 5 to 300 μm in an amount of 10 to 100 mass % with respect to the total mass of the first alumina source material. Thus, when the maximum particle diameter of the first alumina source material for use is set to 300 μm and the material includes the particles having particle diameters of 5 to 300 μm in an amount of 10 to 100 mass %, it is possible to manufacture the cordierite-based honeycomb structure having an excellent quality while maintaining the above effect. When the maximum particle diameter of the first alumina source material is set to 300 μm, the clay for forming the cordierite-based honeycomb structure becomes more homogeneous, and the extrusion molding of the formed honeycomb body is facilitated.

In a case where the maximum particle diameter of the first alumina source material for use is set to 300 μm in this manner, it is further preferable that the first alumina source material includes the particles having particle diameters of 5 to 300 μm in an amount of 10 to 76 mass % with respect to the total mass of the material. This is because, as described above, even the particles which should not be subjected to the spheroidizing treatment are present in the first alumina source material. The particles having particle diameters of 5 μm or more or 5 to 300 μm can be obtained by, for example, passing the material through a sieve having a mesh size corresponding to this particle diameter to sort out the material.

As the silica source material, it is possible to use particles of silica, a silica-containing composite oxide, a substance converted into silica by firing or the like. Specifically, examples of the material include particles of quartz, silica ($SiO_2$), kaolin ($Al_2O_3 \cdot 2SiO_2 \cdot 2H_2O$), talc ($3MgO \cdot 4SiO_2 \cdot H_2O$) and mullite ($3Al_2O_3 \cdot 2SiO_2$).

Particles (silica source material particles) as the above silica source material may contain sodium oxide ($Na_2O$), potassium oxide ($K_2O$) and the like as impurities with the proviso that from viewpoints of preventing a rise of the coefficient of thermal expansion and improving the heat resistance, it is preferable that a ratio of the total mass of the impurities with respect to the total mass of the silica source material particles is 0.01 mass % or less (i.e., 0 to 0.01 mass %). Kaolin particles may contain mica, quartz and the like as the impurities with the proviso that from the viewpoints of preventing the rise of the coefficient of thermal expansion and improving the heat resistance, it is preferable that a ratio of the total mass of the impurities with respect to the total mass of the kaolin particles is 2 mass % or less (i.e., 0 to 2 mass %).

There is not any special restriction on the average particle diameter of the silica source material particles, but quartz particles having particle diameters of about 5 to 50 μm, kaolin particles of 2 to 10 μM, talc particles of 5 to 40 μm and mullite particles of 2 to 20 μm are preferably used.

The magnesia source material may be particles of magnesia, a magnesia-containing composite oxide, a substance converted into magnesia by firing or the like. Specifically, examples of the material include particles of talc and magnesite ($MgCO_3$). Above all, the talc particles are preferable.

Particles (magnesia source material particles) as these magnesia source materials may contain iron oxide ($Fe_2O_3$), calcium oxide (CaO), sodium oxide ($Na_2O$), potassium oxide ($K_2O$) and the like as impurities with the proviso that from the viewpoints of preventing the rise of the coefficient of thermal expansion and improving the heat resistance, it is preferable that a mass ratio of iron oxide with respect to the total mass of the magnesia source material particles is 0.1 to 2.5 mass %. It is similarly preferable that a ratio of the total mass of calcium oxide, sodium oxide and potassium oxide with respect to the total mass of the magnesia source material particles is 0.35 mass % or less (i.e., 0 to 0.35 mass %).

There is not any special restriction on the average particle diameter of the magnesia source material particles, but talc particles having particle diameters of about 5 to 40 μm (preferably 10 to 30 μm) or magnesite particles of 4 to 8 μm are preferably used.

It is to be noted that the silica source material particles or the magnesia source material particles may be subjected to the spheroidizing treatment by a method (the heating treatment or the crushing treatment with the jet air current) similar to that of the above alumina source material particles.

Examples of the dispersion medium to be added to the cordierite forming material include water and a mixed solvent of water and an organic solvent such as alcohol, and water is especially preferably used.

Moreover, when the cordierite forming material and the dispersion medium are mixed and kneaded, an additive such as a pore former, an organic binder or a dispersant may further be added to prepare the resultant clay.

The pore former is an additive which burns out to form pores during firing of a formed body, thereby increasing the porosity to obtain the cordierite-based honeycomb structure having a high porosity. The pore former needs to be a combustible substance which burns out when the formed body is fired, and examples of the substance include carbon such as graphite, flour, starch, phenol resin, methyl polymethacrylate, polyethylene and polyethylene terephthalate, but microcapsules made of an organic resin such as an acrylic resin are preferably usable. Since the microcapsules are hollow particles, they have a high pore forming effect per unit mass. When a small amount of the microcapsules are added, the honeycomb structure having a high porosity can be obtained. In addition, there are advantages that little heat is generated during the firing and that generation of a thermal stress can be reduced.

The organic binder is an additive which imparts fluidity to the clay when formed and which is brought into a gel state in the dried honeycomb body before fired and which performs a function of a reinforcing agent to maintain a mechanical strength of the dried body. Therefore, as the binder, for example, hydroxypropyl methyl cellulose, methyl cellulose, hydroxyethyl cellulose, carboxyl methyl cellulose, polyvinyl alcohol or the like is preferably usable.

The dispersant is an additive which promotes dispersion of the particles or the like constituting the cordierite forming material into the dispersion medium to obtain a homogeneous clay. Therefore, as the dispersant, a substance having an interface activating effect is preferably usable such as ethylene glycol, dextrin, fatty acid soap or polyalcohol.

It is to be noted that the cordierite forming material and the dispersant can be mixed and kneaded in order to obtain the clay in conformity to a known mixing and kneading method. However, it is preferable that the mixing is performed by a method of stirring them while applying a shearing force by use of a mixer which is capable of rotating a stirring blade at a high speed of 500 rpm or more (preferably 1000 rpm or more) and which is excellent in stirring force and dispersing force. According to such a mixing method, it is possible to crush and eliminate an agglomerate of particulates included in the material particles, the agglomerate being a cause for an inner defect of the resultant honeycomb structure.

When the stirring blade is rotated at a higher speed during the mixing, an effect of crushing the agglomerate increases, but in the existing circumstances, a rotation speed of the above device has an upper limit of about 10000 rpm. That is, in the present invention, it is preferable that the rotation speed of the stirring blade is 500 to 10000 rpm, further preferably 1000 to 5000 rpm.

It is to be noted that the mixing can be performed by a known conventional mixer such as a sigma kneader or a ribbon mixer. The kneading can be performed by a known conventional kneader such as a sigma kneader, the Banbury mixer or a screw type extruding kneader. Especially, when a kneader (a so-called vacuum clay kneader, a biaxial continuous kneading extrusion molder or the like) including a vacuum pressure reducing device (e.g., a vacuum pump or the like) is used, the clay having less defects and a satisfactory molderability can preferably be obtained.

Next, the clay obtained in this manner is extruded and formed to obtain the formed honeycomb body in which the plurality of cells are defined by the partition walls. There is not any special restriction on an extrusion molding method, and it is possible to preferably use the extrusion molding method using a die having a desired cell shape, partition wall thickness and cell density.

Next, the resultant formed honeycomb body is dried to obtain the dried honeycomb body. There is not any special restriction on a drying method, and a known conventional drying method is usable such as hot-air drying, microwave drying, dielectric drying, reduced pressure drying, vacuum drying or freeze drying. Above all, a drying method constituted by combining the hot-air drying and the microwave drying or the dielectric drying is preferable in that the whole formed body can quickly and uniformly be dried.

Next, the resultant dried honeycomb body is fired to manufacture the cordierite-based honeycomb structure. This firing means an operation to sinter and densify the material particles (the alumina source material particles, the silica source material particles and the magnesia source material particles) and secure a predetermined strength. Since firing conditions (temperature and time) differ with a type of the material particles constituting the formed honeycomb body, appropriate conditions may be selected in accordance with the type. It is preferable to fire the body, for example, at a temperature of 1410 to 1440° C. for three to ten hours. The firing conditions (temperature and time) less than the above range are not preferable in that there is a possibility that cordierite crystallization of aggregate material particles becomes insufficient.

If the conditions exceed the above range, there is unfavorably a possibility that the cordierite is melted.

It is to be noted that when an operation (calcining) is performed to burn and remove organic substances (the pore former, the organic binder, the dispersant and the like) from the dried honeycomb body before the firing or in a temperature raising process of the firing, the removal of the organic substances can preferably be promoted further. Since a burning temperature of the organic binder is about 200° C. and a burning temperature of the pore former is about 300 to 1000° C., a calcining temperature may be set to about 200 to 1000° C. There is not any special restriction on a calcining time, but the time is usually about ten to 100 hours.

In the cordierite-based honeycomb structure manufactured in this manner, since the number of the openings of the pores formed in the surfaces of the partition walls is larger than that of the conventional honeycomb structure, the pressure loss is reduced. Especially, even while the composition and the porosity of the structure are maintained, the pressure loss is reduced. Therefore, the structure is excellent even in shock resistance and heat resistance.

It is to be noted that there is not any special restriction on the pore diameter (sometimes referred to as a fine hole diameter), the porosity and the like of the resultant cordierite-based honeycomb structure. For example, it is preferable that the pore diameter is 10 to 40 μm, further preferably 15 to 30 μm. It is also preferable that the porosity is 40 to 70%, further preferably 50 to 65%.

It is to be noted that the above pore diameter is a value obtained by mercury porosimetry, and can be measured by, for example, a mercury porosimeter. It is assumed that the above porosity means a porosity $P_o$ calculated from a total pore volume V of the porous body obtained by the above mercury porosimetry and a true specific gravity $d_t$ (2.52 g/cm$^3$ in case of the cordierite) of the material constituting the porous body based on the following formula (2):

$$P_o = V/(V+1/d_t) \times 100 \quad (2),$$

in which $P_o$: porosity, V: total fine hole volume and $d_t$: true specific gravity.

Moreover, in a case where the resultant cordierite-based honeycomb structure is used as a filter for dust collection, the structure further includes plugged portions which alternately plug one opening and the other opening of the cells.

There is not any special restriction on a method of forming the plugged portions, but examples of the method include a method in which an adhesive sheet is attached to one end surface of the cordierite-based honeycomb structure; holes are made in only portions of the adhesive sheet corresponding to the cells to be plugged to form a mask by laser processing or the like using image processing; the end surface of the cordierite-based honeycomb structure having the mask attached thereto is immersed into a ceramic slurry; the cells to be plugged in the cordierite-based honeycomb structure are filled with the ceramic slurry to form the plugged portions; a step similar to this step is performed on the other end surface of the cordierite-based honeycomb structure; and the plugged portions are then dried and fired. The plugged portions may be formed in a dried ceramic body having a honeycomb shape, and the firing of the dried ceramic body may be performed simultaneously with the firing of the plugged portions.

The ceramic slurry can be prepared by mixing at least the material particles (the aggregate material particles) as the aggregate and the dispersion medium (e.g., water or the like). Furthermore, if necessary, an additive such as the binder or the dispersant may be added. There is not any special restriction on the type of the aggregate material particles, but particles constituting the above cordierite forming material are preferably usable. It is preferable to use polyvinyl alcohol or a resin such as methyl cellulose as the binder, and a special carboxylate type polymer surfactant as the dispersant.

It is preferable that a viscosity of the ceramic slurry is adjusted in a range of 5 to 50 Pa·s, more preferably 10 to 30 Pa·s. If the ceramic slurry has an excessively low viscosity, a hollow defect tends to be easily generated. The viscosity of the slurry can be adjusted in accordance with, for example, a ratio between the aggregate material particles and the dispersion medium (e.g., water or the like), an amount of the dispersant or the like.

EXAMPLES

Examples of the present invention will hereinafter be described more specifically, but the present invention is not limited to the following examples.

Example 1

In the present example, as a cordierite-based honeycomb structure, a cordierite-based honeycomb structure (a honeycomb filter) further including plugged portions to alternately plug one opening and the other opening of cells was manufactured. As a specific manufacturing method, first, 42 mass % of talc (an average particle diameter of 21 μm, a degree of circularity of 0.72), 20 mass % of kaolin (an average particle diameter of 11 μm, a roundness of 0.68), 25 mass % of alumina A (an average particle diameter of 2.4 μm, a degree of circularity of 0.71) and 13 mass % of silica (an average particle diameter of 25 μm, a degree of circularity of 0.84) were mixed at this ratio to prepare a cordierite forming material. In the present example, alumina A is a first alumina source material. In the first alumina source material of the present example, a material obtained by sieving the first alumina source material so that the largest particle had a particle diameter of 300 μm or less was used.

Next, with respect to 100 parts by mass of this cordierite forming material, 10.0 parts by mass of carbon (graphite) (an average particle diameter of 53 μm), 2.0 parts by mass of a foaming resin (an average particle diameter of 50 μm), 4 parts by mass of binder, 0.5 parts by mass of surfactant and 31 parts by mass of water were introduced into a kneader, and kneaded for 60 minutes to obtain a clay.

Next, the resultant clay was introduced into a vacuum clay kneader and kneaded to prepare a cylinder-like clay, and this clay was introduced into an extrusion molder and formed into a honeycomb shape in which a plurality of cells were defined by partition walls to obtain a formed honeycomb body. The resultant formed honeycomb body was dielectrically dried, and then absolutely dried with hot air. Both end surfaces were cut into a predetermined dimension to obtain a dried honeycomb body.

Next, one opening and the other opening of the cells of the resultant dried honeycomb body were filled and plugged with a slurry formed of a cordierite forming material having a composition similar to that of the above cordierite forming material.

Next, the body was retained at a maximum temperature of 1420° C. for seven hours, and fired for 120 hours according to firing schedule to manufacture a honeycomb filter using a cylindrical cordierite-based honeycomb structure. In the whole shape of the honeycomb filter, an end surface (cell open surface) shape was a circle of 229.0 mmφ, a length was 305.0 mm, a thickness of the partition wall was 300 μm, and a cell density was $46.5 \times 10^{-2}$ cells/mm$^2$ (300 cells/inch$^2$).

Table 1 shows a degree of circularity of particles (alumina A) as the alumina source material constituting the cordierite forming material used in the present example; an average particle diameter (μm) of the particles; a ratio of included particles having particle diameters of 5 μm or more (substantially 5 to 300 μm, because the maximum particle diameter is 300 μm) with respect to the total mass of the particles (hereinafter referred to as the "5 μm or more ratio (mass %)"); and a ratio of particles included as the alumina source material with respect to the total mass of the cordierite forming material (hereinafter referred to as the "content ratio (mass %)").

except that alumina B to F described in Table 1 were used instead of alumina A. In each resultant honeycomb filter, a ratio (%) of opening areas of pores, a pressure loss (KPa), a compressive strength (MPa), a porosity (%), a pore diameter (μm) and a coefficient ($\times 10^{-6}/°$ C.) of thermal expansion were measured. Measurement results are shown in Table 1., It is to be noted that measuring methods are similar to those of Example 1., As alumina B to F, materials obtained by sieving alumina source materials so that the largest particle had a particle diameter of 300 μm or less were used.

TABLE 1

| | Material | Degree of circularity | Average particle diameter (μm) | 5 μm or more ratio (mass %) | Content ratio (mass %) | Ratio of opening areas of pores (%) | Pressure loss (KPa) | Compressive strength (MPa) | Porosity (%) | Pore diameter (μm) | Coefficient of thermal expansion ($\times 10^{-6}/°$ C.) |
|---|---|---|---|---|---|---|---|---|---|---|---|
| Example 1 | Alumina A | 0.71 | 2.4 | 21 | 25 | 31 | 5.5 | 2.0 | 63 | 20 | 0.5 |
| Example 2 | Alumina B | 0.82 | 2.7 | 23 | 25 | 36 | 5.2 | 2.0 | 63 | 21 | 0.5 |
| Example 3 | Alumina C | 0.90 | 2.5 | 20 | 25 | 40 | 4.9 | 2.0 | 63 | 21 | 0.5 |
| Example 4 | Alumina D | 0.90 | 1.2 | 11 | 25 | 30 | 5.5 | 2.5 | 63 | 18 | 0.4 |
| Example 5 | Alumina E | 0.90 | 4.9 | 48 | 25 | 46 | 4.7 | 1.5 | 63 | 23 | 0.6 |
| Example 6 | Alumina F | 0.90 | 9.0 | 76 | 25 | 50 | 4.6 | 1.0 | 62 | 26 | 0.9 |
| Example 7 | Alumina C | 0.90 | 2.5 | 20 | 10 | 30 | 5.5 | 2.0 | 64 | 21 | 0.5 |
| | Alumina G | 0.61 | 2.6 | 25 | 15 | | | | | | |
| Example 8 | Aluminum hydroxide A | 0.72 | 2.8 | 29 | 33 | 33 | 5.4 | 2.0 | 63 | 22 | 0.5 |
| Comparative Example 1 | Alumina H | 0.90 | 0.5 | 3 | 25 | 19 | 6.3 | 3.0 | 64 | 14 | 0.35 |
| Comparative Example 2 | Alumina C | 0.90 | 2.5 | 25 | 5 | 25 | 5.8 | 2.0 | 63 | 21 | 0.5 |
| | Alumina G | 0.61 | 2.6 | 20 | 20 | | | | | | |
| Comparative Example 3 | Aluminum hydroxide B | 0.62 | 2.7 | 25 | 33 | 21 | 6.3 | 2.0 | 63 | 21 | 0.5 |

Moreover, in the resultant honeycomb filter, a ratio (hereinafter referred to as the "ratio (%) of the opening areas of the pores") of areas of openings of pores formed in the surfaces of the partition walls with respect to the total area in a case where the surfaces of the partition walls were flat surfaces, a pressure loss (KPa), a compressive strength (MPa), a porosity (%), a pore diameter (μm) and a coefficient ($\times 10^{-6}/°$ C.) of thermal expansion were measured. Measurement results of them are shown in Table 1. It is to be noted that the ratio of the opening areas of the pores, the porosity and the pore diameter were measured by the method described above in one embodiment of the present invention.

As a method of measuring the pressure loss, first, a ring having an inner diameter of ϕ215 mm was brought into contact under pressure with both end surfaces of the resultant honeycomb filter, and soot generated by a soot generator was introduced into the inside (in a range of ϕ215.0 mm) of the ring brought into contact under pressure with the end surfaces of this honeycomb filter, and trapped. Moreover, air was passed at a rate of 6.2 Nm³/min through the honeycomb filter in which 33 g of soot in total was trapped, and a difference between pressures before and after the honeycomb filter was obtained to measure the pressure loss.

Moreover, the compressive strength has a value obtained at a time when the resultant honeycomb filter was hollowed out and formed into a columnar shape having a 25.4 mmϕ circular end surface and a length of 25.4 mm, and the compressive strength in a length direction was measured.

Examples 2 to 6

Honeycomb filters were obtained using a cordierite-based honeycomb structure in the same manner as in Example 1

Example 7

A honeycomb filter was obtained using a cordierite-based honeycomb structure in the same manner as in Example 1 except that 10 mass % of alumina C and 15 mass % of alumina G described in Table 1 were used instead of alumina A. In the resultant honeycomb filter, a ratio (%) of opening areas of pores, a pressure loss (KPa), a compressive strength (MPa), a porosity (%), a pore diameter (μm) and a coefficient ($\times 10^{-6}/°$ C.) of thermal expansion were measured. Measurement results are shown in Table 1., It is to be noted that measuring methods are similar to those of Example 1., In the present example, alumina C is a first alumina source material.

Comparative Example 1

A honeycomb filter was obtained using a cordierite-based honeycomb structure in the same manner as in Example 1 except that alumina H described in Table 1 was used instead of alumina A. In the resultant honeycomb filter, a ratio (%) of opening areas of pores, a pressure loss (KPa), a compressive strength (MPa), a porosity (%), a pore diameter (μm) and a coefficient ($\times 10^{-6}/°$ C.) of thermal expansion were measured. Measurement results are shown in Table 1., It is to be noted that measuring methods are similar to those of Example 1.

Comparative Example 2

A honeycomb filter was obtained using a cordierite-based honeycomb structure in the same manner as in Example 1 except that 5 mass % of alumina C and 20 mass % of alumina G described in Table 1 were used instead of alumina A. In the resultant honeycomb filter, a ratio (%) of opening areas of pores, a pressure loss (KPa), a compressive strength (MPa), a porosity (%), a pore diameter (μm) and a coefficient (×10⁻⁶/° C.) of thermal expansion were measured. Measurement results are shown in Table 1., It is to be noted that measuring methods are similar to those of Example 1., As alumina H and alumina G, materials obtained by sieving alumina source materials so that the largest particle had a particle diameter of 300 μm or less were used.

Example 8

In the present example, a honeycomb filter was obtained using a cordierite-based honeycomb structure in the same manner as in Example 1 except that 37 mass % of talc (an average particle diameter of 21 μm, a degree of circularity of 0.72), 19 mass % of kaolin (an average particle diameter of 11 μm, a degree of circularity of 0.68), 33 mass % of aluminum hydroxide A (an average particle diameter of 2.8 μm, a degree of circularity of 0.72) and 11 mass % of silica (an average particle diameter of 25 μm, a degree of circularity of 0.84) were mixed at this ratio to prepare a cordierite forming material. In the resultant honeycomb filter, a ratio (%) of opening areas of pores, a pressure loss (KPa), a compressive strength (MPa), a porosity (%), a pore diameter (μm) and a coefficient (×10⁻⁶/° C.) of thermal expansion were measured. Measurement results are shown in Table 1., It is to be noted that measuring methods are similar to those of Example 1., In the present example, aluminum hydroxide A is a first alumina source material. It is to be noted that as aluminum hydroxide A, a material obtained by sieving an alumina source material so that the largest particle had a particle diameter of 300 μm or less was used.

Comparative Example 3

A honeycomb filter was obtained using a cordierite-based honeycomb structure in the same manner as in Example 1 except that aluminum hydroxide B described in Table 1 was used instead of aluminum hydroxide A. In the resultant honeycomb filter, a ratio (%) of opening areas of pores, a pressure loss (KPa), a compressive strength (MPa), a porosity (%), a pore diameter (μm) and a coefficient (×10⁻⁶/° C.) of thermal expansion were measured. Measurement results are shown in Table 1., It is to be noted that measuring methods are similar to those of Example 1.

Examples 9 to 11

Honeycomb filters were obtained using a cordierite-based honeycomb structure in the same manner as in Example 1 except that 42 mass % of talc (an average particle diameter of 21 μm, a degree of circularity of 0.72), 20 mass % of each kaolin (kaolin A to C) described in Table 2, 25 mass % of aluminum (an average particle diameter of 4.5 μm, a degree of circularity of 0.65) and 13 mass % of silica (an average particle diameter of 25 μm, a degree of circularity of 0.84) were mixed at this ratio to prepare a cordierite forming material. In each resultant honeycomb filter, a ratio (%) of opening areas of pores, a pressure loss (KPa), a compressive strength (MPa), a porosity (%), a pore diameter (μm) and a coefficient (×10⁻⁶/° C.) of thermal expansion were measured. Measurement results are shown in Table 2., It is to be noted that measuring methods are similar to those of Example 1., In the present example, kaolin A to C are first alumina source materials.

TABLE 2

| | Material | Degree of Circularity | Average particle diameter (μm) | 5 μm or more ratio (mass %) | Content ratio (mass %) | Ratio of opening areas of pores (%) | Pressure loss (KPa) | Compressive strength (MPa) | Porosity (%) | Pore diameter (μm) | Coefficient of thermal expansion (×10⁻⁶/° C.) |
|---|---|---|---|---|---|---|---|---|---|---|---|
| Example 9 | Kaolin A | 0.72 | 4.8 | 43 | 20 | 31 | 5.5 | 2.0 | 62 | 21 | 0.5 |
| Example 10 | Kaolin B | 0.81 | 4.7 | 41 | 20 | 34 | 5.2 | 2.0 | 63 | 21 | 0.6 |
| Example 11 | Kaolin C | 0.88 | 4.5 | 38 | 20 | 39 | 4.9 | 2.0 | 63 | 22 | 0.7 |
| Comparative Example 4 | Kaolin D | 0.61 | 4.9 | 47 | 20 | 20 | 6.3 | 2.0 | 62 | 20 | 0.4 |

Comparative Example 4

A honeycomb filter was obtained using a cordierite-based honeycomb structure in the same manner as in Example 9 except that kaolin D described in Table 2 was used instead of kaolin A. In the resultant honeycomb filter, a ratio (%) of opening areas of pores, a pressure loss (KPa), a compressive strength (MPa), a porosity (%), a pore diameter (μm) and a coefficient (×10⁻⁶/° C.) of thermal expansion were measured. Measurement results are shown in Table 2., It is to be noted that measuring methods are similar to those of Example 1.

It is to be noted that as aluminum hydroxide B and kaolin A to D described above, materials obtained by sieving alumina source materials so that the largest particle had a particle diameter of 300 μm or less were used.

In the honeycomb filters obtained in Examples 1 to 11, the ratio of the opening areas of the pores increased, and the pressure loss decreased. On the other hand, in Comparative Example 1, since alumina H having a degree of circularity of 0.9 had an excessively small average particle diameter of 0.5 μm, adjacent particles were densely arranged. In the resultant honeycomb filter, the ratio of the opening areas of the pores decreased, and the pressure loss increased. In Comparative Example 2, since a content ratio of alumina C having a degree of circularity of 0.9 was as low as 5 mass %, it was not possible to obtain an effect of reducing the pressure loss. Even in Comparative Examples 3 and 4, since the degree of circularity of aluminum hydroxide A was as small as 0.62 and the degree of circularity of kaolin D was as small as 0.61, the ratio of the opening areas of the pores decreased, and the pressure loss increased.

Moreover, it has been found that in the honeycomb filters obtained in the examples and the comparative examples, any especially large difference is not seen in the porosities and the pore diameters and that the pressure loss can be reduced even while these characteristics are maintained. It is to be noted that in the honeycomb filter obtained in Example 6, since the average particle diameter of alumina F is as large as 9 μm, cordierite forming reactivity slightly decreases, and therefore the coefficient of thermal expansion slightly increases to 0.9×10⁻⁶/° C. The filter has a large ratio of the opening areas of the pores and a low pressure loss, but there is a possibility that the filter has an inferior resistance to thermal shock. When a high resistance to thermal shock is required, it is preferable that the alumina source material has an average particle diameter of 1 to 5 μm.

INDUSTRIAL APPLICABILITY

According to a cordierite-based honeycomb structure manufacturing method of the present invention, it is possible to obtain a cordierite-based honeycomb structure which is preferably used as a filter or the like and in which a pressure loss is reduced. Since the resultant cordierite-based honeycomb structure easily carries a catalyst and the like on the surfaces of partition walls, the structure is also usable as a preferable catalyst carrier.

The invention claimed is:

1. A method of manufacturing a cordierite-based honeycomb structure, comprising:
    a spheroidizing treatment of heating particles of a first alumina source material to at least a melting temperature of alumina to provide the first alumina source material with particles having a degree of circularity of 0.70 or more;
    adding the first alumina source material, a second alumina source material including particles not subjected to sphcroidizing treatment, a silica source material and a magnesia source material to obtain a cordierite forming material in which only the first alumina source material particles have been subjected to the spheroidizing treatment, and wherein the first alumina source material has an average particle diameter of 1-10 μm and is added in an amount of 10 mass % or more with respect to the total mass of the cordierite forming material;
    adding a dispersion medium to the resultant cordierite forming material to obtain a clay;
    extruding the resultant clay into a honeycomb shape to obtain a formed honeycomb body in which a plurality of cells are defined by partition walls;
    drying the resultant formed honeycomb body to obtain a dried honeycomb body; and
    firing the resultant dried honeycomb body to manufacture the cordierite-based honeycomb structure.

2. The method of manufacturing the cordierite-based honeycomb structure according to claim 1, wherein the first alumina source material includes particles of alumina and/or aluminum hydroxide.

3. The method of manufacturing the cordierite-based honeycomb structure according to claim 1, wherein the first alumina source material includes particles having particle diameters of 5μm or more in an amount of 10 mass % or more with respect to the total mass of the first alumina source material.

4. The method of manufacturing the cordierite-based honeycomb structure according to claim 1, wherein the first alumina source material particles have a degree of circularity of 0.80 or more.

5. The method of manufacturing the cordierite-based honeycomb structure according to claim 1, wherein the first alumina source material particles have a degree of circularity of between 0.70 and 0.90, inclusive.

6. The method of manufacturing the cordierite-based honeycomb structure according to claim 1, wherein the first alumina source material particles have a degree of circularity of between 0.80 and 0.90, inclusive.

7. The method of manufacturing the cordierite-based honeycomb structure according to claim 1, wherein the first alumina source material particles have an average particle diameter of 1-5 μm.

8. The method of manufacturing the cordierite-based honeycomb structure according to claim 1, wherein the particles of the first alumina source material are heated to a temperature of 2050° C.-2350° C. to melt the surfaces of the particles.

9. The method of manufacturing the cordierite-based honeycomb structure according to claim 1, wherein the first alumina source material is added in an amount of 10 to 33 mass % with respect to the total mass of the cordierite forming material.

* * * * *